United States Patent [19]

Middlemiss

[11] 3,890,347

[45] June 17, 1975

[54] ISOINDOLINE DERIVATIVES

[75] Inventor: David Middlemiss, London, England

[73] Assignee: Allen and Hanburys Limited, London, England

[22] Filed: Nov. 24, 1972

[21] Appl. No.: 308,958

[30] Foreign Application Priority Data
Dec. 8, 1971 United Kingdom............... 56977/71

[52] U.S. Cl........ 260/326.1; 260/326 C; 260/346.3; 424/274
[51] Int. Cl.² .................................... C07D 205/12
[58] Field of Search ................................. 260/326.1

[56] References Cited
OTHER PUBLICATIONS
Quinkert et al., Chem. Abs., Vol. 65, 8853–8855, (1966).

Primary Examiner—Richard J. Gallagher
Attorney, Agent, or Firm—Bacon and Thomas

[57] ABSTRACT

Compounds of the general formula I:

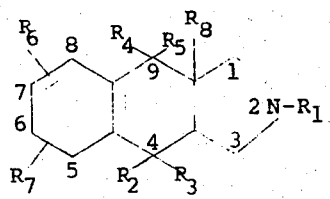

and non-toxic pharmaceutically acceptable acid addition salts thereof, in which;

$R_1$ represents a hydrogen atom or a straight or branched chain alkyl ($C_1$-$C_6$) or alkenyl group ($C_2$-$C_6$) which alkyl or alkenyl group may be substituted by hydroxy, alkoxy, aryl, aryloxy, aroyl, amino, alkylamino or dialkylamino groups or may represent carbamoyl or alkyl carbamoyl; $R_2$, $R_3$, $R_4$ and $R_5$ which may be the same or different represent separately a hydrogen atom, an alkyl group ($C_1$-$C_6$), a hydroxy group, or a phenyl group; or $R_2$ and $R_4$ may be joined to form a methylene bridge ($C_1$); $R_6$ and $R_7$ which may be the same or different represent one or more groups selected from hydrogen, alkyl, hydroxy, hydroxyalkyl, alkoxy, acyloxy, halogen, nitro, or a group of the formula —$NR_9R_{10}$ wherein $R_9$ and $R_{10}$ which may be the same or different represent hydrogen, alkyl, hydroxyalkyl, alkylsulphonyl, acyl, or alkoxycarbonyl; and $R_8$ represents hydrogen or alkyl ($C_1$-$C_6$) with the proviso that $R_2$ and $R_5$ cannot both be phenyl when $R_5$, $R_4$, $R_6$, $R_7$ and $R_8$ are hydrogen and $R_1$ is methyl.

These compounds have biological activity, particularly as analgetics.

53 Claims, No Drawings

ISOINDOLINE DERIVATIVES

This invention relates to novel isoindoline derivatives, to therapeutic compositions containing them and to processes for the production of such compounds.

The present invention provides isoindoline derivatives of the general formula I:

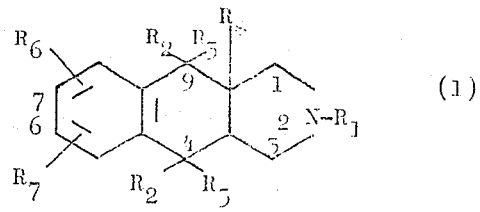

and non-toxic pharmaceutically acceptable acid addition salts thereof, in which;

$R_1$ represents a hydrogen atom or a straight or branched chain alkyl ($C_1$-$C_6$) or alkenyl group ($C_2$-$C_6$) which alkyl or alkenyl group may be substituted by hydroxy, alkoxy, aryl, aryloxy, aroyl, amino, alkylamino or dialkylamino groups, or may represent carbamoyl or alkyl carbamoyl; $R_2$, $R_3$, $R_4$ and $R_5$ which may be the same or different represent separately a hydrogen atom, an alkyl group ($C_1$-$C_6$), a hydroxy group, or a phenyl group, or $R_2$ and $R_4$ may be joined to form a methylene bridge ($C_1$); $R_6$ and $R_7$ which may be the same or different represent one or more groups selected from hydrogen, alkyl, hydroxy, hydroxyalkyl, alkoxy, acyloxy, halogen, nitro, or a group of the formula —$NR_9R_{10}$ wherein $R_9$ and $R_{10}$ which may be the same or different represent hydrogen, alkyl, hydroxyalkyl, alkylsulphonyl, acyl, or alkoxycarbonyl; and $R_8$ represents hydrogen or alkyl ($C_1$-$C_6$). With the proviso that $R_2$ and $R_5$ cannot both be phenyl when $R_3$, $R_4$, $R_6$, $R_7$ and $R_8$ are hydrogen and $R_1$ is methyl.

Preferred meanings for the above groups are as follows:

$R_1$ = hydrogn, alkyl ($C_{1-4}$), alkenyl ($C_{2-6}$), alkyl ($C_{1-4}$) substituted by hydroxy, alkyl ($C_{1-4}$) substituted by amino, alkyl ($C_{1-4}$) substituted by dialkyl ($C_{1-4}$) amino, $R_2$ = hydrogen or together with $R_4$ forms a methylene bridge $R_3$ = hydrogen $R_4$ = hydrogen or a hydroxy group or together with $R_2$ represents a methylene bridge $R_5$ = hydrogen $R_6$ = hydrogen or dialkyl ($C_{1-4}$) amino $R_7$ = hydrogen, hydroxyalkyl ($C_{1-4}$), or a group —$NR_9R_{10}$ in which $R_9$ represents hydrogen or alkyl ($C_{1-4}$) and $R_{10}$ represents hydroxyalkyl $R_8$ = hydrogen When $R_1$ is alkyl substituted by aryloxy the aryl group may be substituted, for example with a lower ($C_1$-$C_4$) alkoxy group, and when it is alkyl substituted by aroyl the aryl group may be substituted with for example, halogen in particular fluorine.

The compounds according to the invention can exhibit isomerism. The invention therefore extends to all such isomers including all possible diastereoisomers and optical enantiomers. The invention also includes acyl esters of those compounds containing alcoholic or phenolic functions. Particularly useful salts of the compounds are acid-addition salts, such as those with mineral acids, e.g., hydrochloric and sulphuric acid and those with organic acids e.g. tartaric and maleic acids.

The compounds according to the invention have biological activity, for example, marked analgetic activity. Furthermore no Straub Index can be recorded nor is their analgetic action significantly antagonised by nalorphine or naloxone in vitro or in vivo. These characteristics are often associated with non-narcotic analgetics in man. For example, in Table I the compound 3a, 4, 9, 9a-tetrahydro-2-methyl-benz[f]isoindoline, maleate (AH 8649) of Example 3 is compared with aspirin, codeine, and morphine in standard pharmacological tests for evaluating analgetic action and is also shown to be as active as codeine in inhibiting the pain response to electrical stimulation of the dental pulp in the dog. (Mitchell C.L., J. Pharmacol, 1964, 146, 1).

TABLE 1

| Drug | Inhibition of Phenylquinone writhing in the mouse. | Inhibition of hot plate-induced pain in the mouse. | | Inhibition of the response to dental pulp stimulation in the dog. | Straub Index = I.V. $LD_{50}$ / I.V. $ED_{50}$ |
|---|---|---|---|---|---|
| | Oral $ED/_{50}$ mg/Kg | Oral $ED/_{50}$ mg/Kg | Subcut. $ED/_{50}$ mg/Kg | Minimum effective oral dose mg/Kg | I.V. $ED_{50}$ |
| AH 8649 | 8.9 | 29.5 | 13.5 | 3.75 | <0.84 |
| Aspirin | 37.0 | — | >100 | 15.0 | — |
| Codeine | 14.1 | 15.5 | 18.8 | 3.75 | 3.0 |
| Morphine | 1.1 | 9.8 | 1.7 | 1.25 | 78.0 |

The invention also provides pharmaceutical compositions of compounds of formula (I), or of a salt thereof.

The pharmaceutical compositions according to the invention, may be formulated for use in the conventional manner with the aid of carriers or excipients and formulatory agents as required and with or without supplementary medicinal agents.

Oral administration is most convenient in the form of tablets. Carriers include inert diluents such as calcium sulphate or calcium phosphate and/or disintegrating agents such as starch. Magnesium stearate may be used as a lubricating agent. The dosage at which the active ingredient is administered may vary within a wide range dependent on the age, weight and condition of the patent. A suitable oral dosage range is generally from 5 to 500 mgs. The pharmaceutical compositions may, with advantage, be formulated to provide a dose within these ranges either as a single unit or as a number of units.

The compounds according to the invention may be prepared by a main process which may be adapted to produce the substitution pattern required.

The key intermediate in the synthesis is the imide (III) which may be prepared from the anhydride (II) or the corresponding acid and the appropriate amine $R_1NH_2$ for example by heating at elevated temperatures.

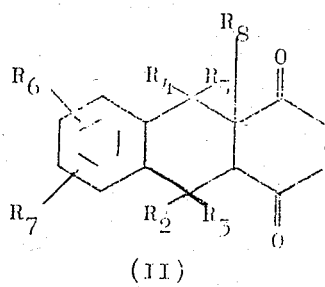

(II)

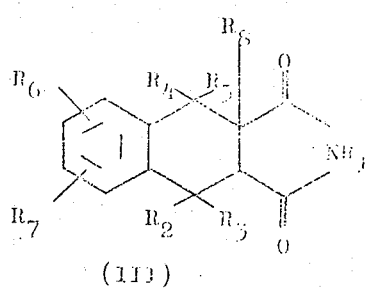

(III)

wherein $R_1, R_2, R_3, R_4, R_5, R_6, R_7, R_8$ have the meanings stated.

The anhydride (II) may be made from a coupling reaction between an o-xylylene dibromide (IV) and a maleic anhydride (V) (X=O) in the presence of a zinc catalyst activated by copper and a solvent such as dimethylformamide

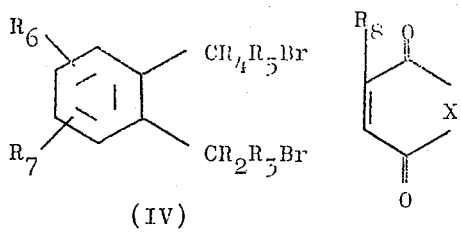

(IV)            (V)

This reaction may be carried out preferably at between 0°C and ambient temperature.

Alternatively the imide (III) may be obtained directly by a similar condensation of the dibromide (IV) and maleimide (V) wherein $X=NR_1$ and $R_1$ has the meanings already stated.

The imide (III) can be converted into compounds of general formula (I) of the invention by reduction with a complex metal hydride. A particularly preferred reducing agent is lithium aluminium hydride. Reduction may be effected by heating in an organic solvent at reflux temperature.

The desired substituents $R_1 - R_8$ may be present throughout or may be introduced at convenient stages in this synthetic scheme by conventional chemical methods.

Thus for example, compounds wherein $R_1$ is other than hydrogen as for example alkyl or alkenyl may be prepared from compounds of the general formula (I) wherein $R_1$ is hydrogen and standard alkylating agents, e.g., alkyl or allyl halides. Also where $R_1$ represents hydrogen these compounds may be prepared from compounds in which $R_1$ is benzyl by reduction for example with hydrogen using a palladised charcoal catalyst. Also where $R_1$ represents a carbamoyl ($-CONH_2$) group the compounds may be prepared from the compound in which $R_1 = H$ by reaction with an alkali metal isocyanate and acetic acid. Compounds in which the group $R_1$ represents H may be converted to groups in which $R_1$ is other than H by reductive alkylation with a ketone yielding such a group $R_1$.

The substituents $R_6$ or $R_7$ (in Ring A) may be introduced by standard procedures of aromatic chemistry well known to those skilled in the art. Thus one may nitrate a compound in which $R_6$ or $R_7$ is hydrogen to produce a nitro compound. The nitro group may be reduced to an amine which by diazotisation and hydrolysis may give rise to a hydroxy group. The last may, in turn be converted into an alkoxy group, e.g. by reaction with a trialkyloxosulphonium chloride in the presence of sodium hydride, or into an acyloxy group, e.g., by acylation for example with acetic acid anhydride in pyridine. The amino group may be converted into an AlkSO$_2$NH— group by reaction with an alkyl sulphonyl chloride or into an amide (AlkCONH—) group by reaction with an anhydride, such as acetic anhydride, or with an acyl chloride. The amino group may be also converted into a halogen atom by reaction of the diazonium salt with the appropriate copper halide, e.g. cuprous chloride. Reaction of the amino function with an alkylchloroformate gives the carbamate which, in turn, yields a methylamino group on reduction with lithium aluminium hydride. One may also react the compound in which $R_6$ is amino with formaldehyde and formic acid to give the N,N-dimethyl amine and at the same time introduce a hydroxymethyl group at $R_7$. Compounds in which $R_6$ or $R_7$ is an acyl group may be prepared by a Friedel-Crafts reaction using aluminum chloride and an acyl halide. The resulting ketone may then be reduced to the corresponding alcohol ($R_6$ = hydroxyalkyl). Further conversions include reacting the compounds in which $R_7$ is dialkylamino with formaldehyde to produce the N-alkyl N-hydroxyalkyl compound and the production of the compounds in which $R_6$ and $R_7$ are both nitro by direct nitration of the compound in which $R_6$ and $R_7$ are hydrogen. Other standard interconversions are illustrated in the Examples.

Other useful interconversions may be achieved in Ring B from the bromoimide (VI) (Y = Br) obtained, in turn, from the imide (III) ($R_5$ = H) and N-bromosuccinimide. The halogen can be displaced by treatment with silver acetate to give the imide (VI) (Y =AcO—) in two diastereoisomeric forms which can be reduced as before with a complex metal hydride such as lithium aluminium hydride to give the alcohol (VII), where $R_4 = H$

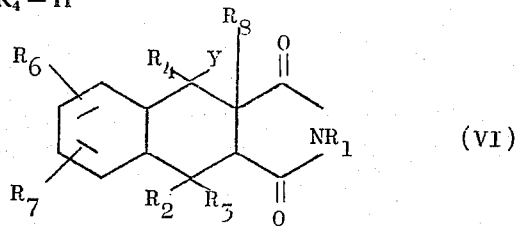

(VI)

This alcoholic function may be converted into a ketone (VIII) by standard oxidation processes e.g. by Jones' reagent,

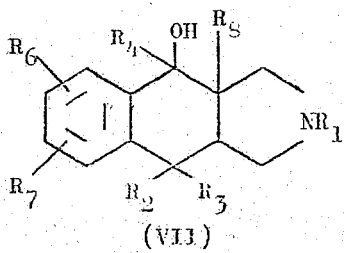

(VII)

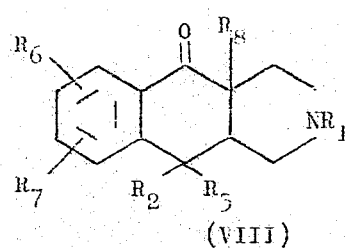

(VIII)

Other substituents $R_4$ and $R_5$ can then be introduced by conventional methods involving attack on the carbonyl function, e.g., with Grignard or organolithium reagents to give compounds of the invention where $R_4$ is alkyl, or phenyl and $R_5$ is hydroxy. Hydrogenolysis of the hydroxy group then gives compounds of the general formula (I) wherein $R_4$ and $R_5$ are alkyl or acyl.

The following Examples illustrate the invention (Examples 1, 2 and 34 describe the production of intermediates).

EXAMPLE 1

1,2,3,4-Tetrahydro-6-hydroxy-2,3-naphthalene dicarboxylic acid, acetate ester

A solution of maleic anhydride (6 g.) in dimethylformamide (100 ml.) was cooled to 0°C and zinc dust (1 g.) and copper sulphate (100 mg.) were added with stirring. When the mixture had warmed to 20°C a solution of maleic anhydride (2 g.) and α,α-dibromo-3,4-dimethyl phenol, acetate ester (6.4 g.) in dimethylformamide was added dropwise over 6 hr. Zinc dust (200 mg.) was added every hour. After 18 hrs. the mixture was filtered through Hyflo and the filtrate poured into water (500 ml.) and conc. HCl (10 ml.). The solution was extracted with ethyl acetate and the extracts were dried and evaporated to leave a brown oil which afforded a pale yellow solid on trituration with ethyl acetate. Recrystallisation from aqueous methanol gave colourless prisms m.p. 204°.

EXAMPLE 2

N-Benzyl-1,2,3,4-tetrahydro-2,3-naphthalene dicarboximide

A solution of N-benzyl maleimide (5.5 g.) in dimethylformamide (50 ml.) was cooled to 0°C and zinc dust (400 mg.) added with stirring. When the mixture had warmed to 20°C, a solution of α,α'-dibromo-o-xylene (2.6 g.) and N-benzylmaleimide (2 g.) in dimethylformamide (15 ml.) was added dropwise over 6 hrs. Zinc dust (200 mg.) was added every hour. After 18 hours the mixture was filtered through Hyflo and the filtrate poured into water (250 ml.). The yellow oily solid was extracted with ethyl acetate and the organic phase washed with brine, dried and evaporated to leave a yellow oil which crystallised on trituration with ether. Recrystallisation from ethyl acetate afforded colourless microcrystals m.p. 160.6°C.

EXAMPLE 3

3a,4,9,9a-Tetrahydro-2-methylbenz[f]isoindoline, maleate a. 1,2,3,4-Tetrahydro-N-methyl-2,3-naphthalene-dicarboximide 1,2,3,4-Tetrahydro-2,3-naphthalene dicarboxylic anhydride (1.5 g.) was treated with aqueous methylamine (33%, 20 ml.) and the solution evaporated to dryness in vacuo. The brown residue was heated at 210° for 10 minutes and cooled to give a solid which crystallised from light petroleum (b.p. 80°–100°) as colourless nodules, m.p. 146.1°.

b. 3a,4,9,9a-Tetrahydro-2-methylbenz[f]isoindoline, maleate 1,2,3,4-Tetrahydro-N-methyl-2,3-naphthalene dicarboximide (0.9 g.) was continuously extracted from a Soxhlet apparatus into a stirred suspension of lithium aluminium hydride (1 g.) in dry ether (130 ml.). After 2 days the reaction was cooled and the excess of the hydride decomposed with water. The ether layer was separated, dried ($MgSO_4$) and evaporated and the residue was converted into a maleate salt, m.p. 155°.

By a similar method the corresponding compounds were prepared from the corresponding anhydride and the primary amine. 3a,4,9,9a-Tetrahydro-2-methylbenz[f]isoindolin-6-1, m.p. 228° (EtOH).

3a,4,9,9a-Tetrahydro-2-isopropylbenz[f]isoindoline, maleate, m.p. 205° (MeOH/EtOAc). 2-Benzyl-3a,4,9,9a-tetrahydrobenz[f]isoindoline, maleate, m.p. 172° (EtOH/EtOAc).

3a,4,9,9a-Tetrahydro-2-phenethylbenz[f]isoindoline, hydrochloride, m.p. 211° dec. (MeOH/EtOAc).

2-[2-(Diethylamino)ethyl]-3a,4,9,9a-tetrahydrobenz[f] isoindoline, dimaleate, m.p. 165° (EtOH/EtOAc).

2-[3-(Dimethylamino)propyl]-3a,4,9,9a-tetrahydrobenz[f] isoindoline, hydrochloride, m.p. 273° (MeOH/EtOAc).

3a,4,9,9a-Tetrahydro-2-benz[f]isoindoline ethanol, m.p. 86°C (light petroleum b.p. 80°–100°).

3a,4,9,9a-Tetrahydro-2-propylbenz[f]isoindoline, maleate, m.p. 101° (from ether).

EXAMPLE 4

2-Ethyl-3a,4,9,9a-tetrahydrobenz[f]isoindoline, maleate a. N-Ethyl-1,2,3,4-tetrahydro-2,3-naphthalene dicarboximide 1,2,3,4-Tetrahydro-2,3-naphthalene-dicarboxylic anhydride (2 g.) was dissolved in 70% aqueous ethylamine (30 ml.) and the solution evaporated to dryness. The residue was heated at 180° for 10 minutes and then cooled to give the imide, m.p. 92°–3° (light petroleum b.p. 80°–100°).

b. 2-Ethyl-3a,4,9,9a-tetrahydrobenz[f]isoindoline, maleate

A solution of N-ethyl-1,2,3,4-tetrahydro-2,3-naphthalene dicarboximide (500 mg.) in ether (50 ml.) was added to a suspension of lithium aluminium hydride (500 mg.) in ether (100 ml.). After being heated under reflux overnight the reaction was cooled and the excess of the hydride decomposed with water. The ether was separated, dried (MgSO₄) and evaporated to leave a colourless oil which was converted into a maleate salt, m.p. 93° (Et₂O/EtOAc).

EXAMPLE 5

3a,4,9,9a-Tetrahydrobenz[f]isoindoline maleate

A solution of 2-benzyl-3a,4,9,9a-tetrahydrobenz[f]isoindoline (590 mg.) prepared according to Example 3 in ethanol (50 ml.) was hydrogenated in the presence of 10% palladium oxide on carbon catalyst (200 mg.). After the theoretical volume of hydrogen had been taken up the catalyst and the solvent were removed to leave a colourless oil which crystallised on standing. This formed a maleate salt, m.p. 158° (EtOAc).

In similar manner 3a,4,9,9a-tetrahydro-4,9-endomethanobenz[f]isoindoline, hydrochloride, m.p. 266° (from MeO/EtOAc) was prepared from 2-benzyl-3a,4,9,9a-tetrahydro-4,9-endo-methanobenz[f]isoindoline.

EXAMPLE 6

3a,4,9,9a-Tetrahydro-2(3-methylbut-2-enyl)benz[f]isoindoline, hydrochloride

A mixture of 3a,4,9,9a-tetrahydrobenz[f]isoindoline (1.6 g.) dimethyl allyl bromide (1.5 g.) potassium carbonate (1.6 g.) and sodium iodide (1.5 g.) in 2-butanone (50 mls.) was stirred under reflux for 48 hr. After evaporation of the solvent, the residue was acidified, washed with ethyl acetate, and then basified. The basic solution was extracted three times with ether and the extracts were dried and evaporated to leave a brown oil which crystallised on standing. Chromatography on alumina (150 g. Laporte 'H') with cyclohexane/ethyl (3:1) afforded the major product as a yellow oil which was converted into a hydrochloride salt. Recrystallisation from ethyl acetate gave colourless microcrystals, m.p. 159°.

EXAMPLE 7

3a,4,9,9a-Tetrahydro-2-methyl-6-nitrobenz[f]isoindoline, hydrochloride 3a,4,9,9a-Tetrahydro-2-methylbenz[f]isoindoline, maleate (15 g.) was added portionwise to a stirred mixture of conc. nitric acid (38 ml.) and the conc. sulphuric acid (19 ml.) at −20°C. The amber solution was allowed to warm up to 10°C and then poured on to crushed ice, basified and extracted with ether. Evaporation of the dried extract left an amber oil which was converted into a hydrochloride salt, m.p. 264° (MeOH/EtOAc).

EXAMPLE 8

6-Amino-3a,4,9,9a-tetrahydro-2-methylbenz[f]isoindoline

A solution of 3a,4,9,9a-tetrahydro-2-methyl-6-nitrobenz[f]isoindoline hydrochloride (20 g.) in methanol (450 ml.), conc. hydrochloric acid (5 ml.) and ethanol (50 ml.) was hydrogenated over 10% palladium oxide on charcoal catalyst (1g.). After the theoretical amount of hydrogen had been absorbed the solvent and catalyst were removed. The residue was dissolved in sodium carbonate solution and extracted with ehtyl acetate. Evaporation of the dried extract left an amber oil which crystallised from light petroleum (b.p. 80°-100°) as colourless prisms, m.p. 143°.

EXAMPLE 9

3a,4,9,9a-Tetrahydro-2-methylbenz[f]isoindolin-6-ol

Sodium nitrite (2.1 g.) in water (15 ml.) was added dropwise over 45 min. to a stirred solution of 6-amino-3a,4,9,9a-tetrahydro-2-methylbenz[f]isoindoline (5 g.) and conc. sulphuric acid (5.5 ml.) in water (55 ml.) at temperatures between −5° and 0°C and under nitrogen. The yellow solution was heated to 70°C, solution of conc. sulphuric acid (36 ml.) in water (36 ml.) added dropwise over 10 min. and the temperatue raised to 80°C over 30 min. The solution was cooled, poured into ice-water, basified with ammonium hydroxide (150 ml.). The light brown precipitate was filtered off and crystallised from ethanol to afford pale yellow platelets, m.p. 228°.

EXAMPLE 10

3a,4,9,9a-Tetrahydro-2,3a-dimethylbenz[f]isoindoline, (-) di-p-toluoyl tartrate, hemihydrate a. 1,2,3,4-Tetrahydro-2-methyl-2,3-naphthalene dicarboxylic acid A solution of freshly distilled citraconic anhydride (6.5 g.) in dimethylformamide (75 ml.) was cooled to 0°C. Zinc (1 g.) and cuprous chloride (200 mg.) were added and the mixture allowed to warm to room temperature. A solution of α,α'-dibromo-o-xylene (5 g.) and citraconic anhydride (2 g.) in dimethylformamide (50 ml.) was then added dropwise over 7 hours. Further portions of zinc (0.25 g.) were also added at half hour intervals. The mixture was stirred overnight, filtered through Hyflo, poured into water (550 ml.) and concentrated hydrochloric acid (5 ml.), and extracted with ether. Evaporation of the dried extracts left a brown gum. THis was treated 2N sodium hydroxide and the solution washed with ethyl acetate. The aqueous phase was acidified and extracted with ethyl acetate. Evaporation of the dried extracts left a brown gum which afforded colourless microcrystals, m.p. 160°, on trituration with benzene.

b. 1,2,3,4-Tetrahydro-N,2-dimethyl-2,3-naphthalene dicarboximide 1,2,3,4-Tetrahydro-2-methyl-2,3-naphthalene dicarboxylic acid (0.9 g.) was dissolved in ethanolic methylamine (10 ml.) and the solution evaporated to dryness. The residue was heated at 180°C until evolution of steam ceased and then cooled to give the crystalline imide, m.p. 127.5°.

c. 3a,4,9,9a-Tetrahydro-2,3a-dimethylbenz[f]isoindoline, (-) di-p-toluoyl tartrate, hemihydrate A solution of 1,2,3,4-tetrahydro-N,2-dimethyl-2,3-naphthalene dicarboximide, (600 mg.) in dry tetrahydrofuran (25 ml.) was added dropwise to a stirred suspension of lithium aluminium hydride (400 mg.) in dry ether (100 ml.). After being heated under reflux overnight the reaction mixture was cooled and the excess of the hydride decomposed with water. The mixture was filtered through Hyflo and the ether layer was separated, dried (MgSO₄), and evaporated to leave a brown oil. A solution of this residue in ether (15 ml.) was treated with (-)di-p-toluoyl tartaric acid (1 g.) in ether (10 ml.) and enough methanol added to dissolve the resultant sticky solid. A buff microcrystalline solid separated on standing, m.p.141°.

EXAMPLE 11

(3a,4,9,9a-Tetrahydro-2-methylbenz[f]isoindolin-6-yl) acetamide, acetate, hemihydrate 6-Amino-3a,4,9,9a-tetrahydro-2-methylbenz[f]isoindoline (1 g.) was dissolved in acetic anhydride (2 ml.) and the amber solution evaporated to dryness. Recrystallisation of the residue from ethyl acetate afforded colourless microcrystals m.p. 103°.

EXAMPLE 12

6-Chloro-3a,4,9,9a-tetrahydro-2-methylbenz[f]isoindoline, maleate

6-Amino-3a,4,9,9a-tetrahydro-2-methylbenz[f]isoindoline (7.2 g.) in concentrated hydrochloric acid (10 ml.) and water (10 ml.) was cooled to 0°C and a solution of sodium nitrite (2.4 g.) in water (5 ml.) added dropwise over 10–15 minutes while keeping the temperature below 5°C by the addition of crushed ice.

The cold solution was added slowly with stirring to a cold solution of cuprous chloride (6.5 g.) in concentrated hydrochloric acid (20 ml.) and then allowed to warm to room temperature. After being heated to 60 °C. the mixture was extracted with dichloroethane (2 × 30 ml.) and the organic phase dried and evaporated to leave a brown gum (12 g.). This was heated with 5N sodium hydroxide solution (150 ml.) and the suspension extracted with ether (2 × 40 ml.). Evaporation of the dried extract left a mobile brown oil (5.8 g.) which was dissolved in ethyl acetate and treated with a hot solution of maleic acid (3 g.) in ethyl acetate (25 ml.). Cooling afforded the maleate salt as buff microcrystals, m.p. 137°.

EXAMPLE 13

3a,4,9,9a-Tetrahydro-2-methylbenz[f]isoindoline-6-carbamic acid, ethyl ester, hydrochloride A solution of 6-amino-3a,4,9,9a-tetrahydro-2-methylbenz[f]isoindoline (1 g.) in dry benzene (30 ml.) was added dropwise over one hour to a stirred refluxing solution of ethyl chloroformate (0.6 ml.) in dry benzene (100 ml.). After a further 2 hours the mixture was cooled and the precipitate (1.4 g.) was filtered off and recrystallised from methanol/ethylacetate to give the hydrochloride salt as buff microcrystals m.p. 173°. By a similar method 3a,4,9,9a-tetrahydro-2-methyl-6-(methylamino)benz[f]isoindoline was converted into 3a,4,9,9a-tetrahydro-N,2-dimethylbenz[f]isoindoline-6-carbamic acid, ethyl ester, (-)di-p-toluoyltartrate, m.p. 143° (ethyl acetate).

EXAMPLE 14

3a,4,9,9a-Tetrahydro-2-methyl-6-(methylamino)-benz[f]isoindoline

A solution of 3a,4,9,9a-tetrahydro-2-methylbenz[f]isoindolin-6-carbamic acid, ethyl ester (1 g.) in dry ether (30 ml.) was added dropwise to a stirred suspension of lithium aluminium hydride (300 mg.) in dry ether (100 ml.). After being heated under reflux overnight the excess of reducing agent was decomposed with water, the mixture was filtered through Hyflo, and filtrate was dried and evaporated to leave a colourless solid m.p. 96°–99°. Recrystallisation from petrol (60–80) afforded colourless clusters, m.p. 101°.

By a similar method 3a,4,9,9a-tetrahydro-N,2-dimethylbenz[f]isoindolin-6-carbamic acid, ethyl ester was converted into 6-(dimethylamino)-3a,4,9,9a-tetrahydro-2-methylbenz[f]isoindoline, m.p. 62°C.

EXAMPLE 15

3a,4,9,9a-Tetrahydro-2-methylbenz[f]isoindolin-4α-ol a. 1,2,3,4-Tetrahydro-1α-hydroxy-N-methyl-2,3-naphthalene dicarboximide A solution of 1,2,3,4-tetrahydro-1α-hydroxy-2,3-naphthalene dicarboxylic anhydride (800 mg.) in ethanolic methylamine (25 ml.) was evaporated to dryness and the residue pyrolysed at 180°C until bubbling ceased. The brown oil crystallised on cooling to give yellow microcrystals (800 mg.). Recrystallisation from ethanol gave the imide as colourless microcrystals, m.p. 162°.

b. 3a,4,9,9a-Tetrahydro-2-methylbenz[f]isoindolin-4α-ol

A solution of 1,2,3,4-tetrahydro-1α-hydroxy-N-methyl-2,3-naphthalene dicarboximide (500 mg.) in tetrahydrofuran (25 ml.) and ether (10 ml.) was added dropwise to a stirred suspension of lithium aluminium hydride (300 mg.) in ether (100 ml.) and the mixture was heated under reflux overnight. The excess of the reducing agent was decomposed with water and the organic phase was decanted off, dried and evaporated to leave a colourless oil (400 mg.). Crystallisation from cold ether gave the amine as colourless microcrystals, m.p. 123°–5°.

EXAMPLE 16

3a-4,9,9a-Tetrahydro-2-methylbenz[f]isoindolin-4β-ol a. 1-Bromo-1,2,3,4-tetrahydro-N-methyl-2,3-naphthalene dicarboximide N-Bromosuccinimide (33 g.) was added portionwise to a stirred solution of 1,2,3,4-tetrahydro-N-methyl-2,3-naphthalene dicarboximide (27 g.) and benzoyl peroxide (3 crystals) in carbon tetrachloride (250 ml.) at reflux. After 2 hours the mixture was chilled, the succinimide was filtered off, and the filtrate was evaporated. Crystallisation of the oily residue from methanol afforded cream microcrystals, m.p. 134°.

b. 1-β-acetoxy-1,2,3,4-tetrahydro-N-methyl-2,3-naphthalene dicarboximide

1-Bromo-1,2,3,4-tetrahydro-N-methyl-2,3-naphthalene dicarboximide (18 g.) and silver acetate (12 g.) in glacial acetic acid (100 ml.) were kept in the dark and stirred at room temperature overnight. The solution was filtered and the filtrate was poured onto ice (300 g.) and extracted with ethyl acetate. Evaporation of the dried extracts and trituration of the residue with ethanol gave colourless microcrystals (7 g.), m.p. 134°. Fractional crystallisation from ethanol afforded the α-acetate, (3.2 g.) m.p. 161° and from the mother liquors, the crude β-acetate, (3.8 g.) m.p. 110°–140°.

c. 3a,4,9,9a-Tetrahydro-2-methylbenz[f]isoindolin-4β-ol

A solution of the above crude 1β-acetoxy-1,2,3,4-tetrahydro-N-methyl-2,3-naphthalene dicarboximide (2.5 g.) in dry ether (20 ml.) and dry tetrahydrofuran (15 ml.) was added dropwise to a stirred refluxing suspension of lithium aluminium hydride (2.4 g.) in dry ether (90 ml.). After 2 hours the excess of the reducing agent was decomposed with dilute hydrochloric acid and the aqueous phase was separated, washed with ether, and basified. The emulsion was filtered through Hyflo and the filtrate extracted with ethyl acetate. Evaporation of the dried extracts left a cream solid (1.4 g.). Two recrystallisations from ethyl acetate afforded colourless microcrystals, m.p. 173°–5°.

EXAMPLE 17

3a,4,9,9a-Tetrahydro-4,9-exo-methano-2-methylbenz[f]isoindoline, maleate a. 1,2,3,4-Tetrahydro-1,4-exo-methano-2,3-naphthalene dicarboxylic anhydride 1,2,3,4-Tetrahydro-1,4-methano-2,3-naphthalene trans-dicarboxylic acid (10 g.) was stirred and heated at 260°C for 1 hour under reduced pressure. On cooling, the crystalline residue and the sublimate were combined and recrystallised twice from ethyl acetate to give colourless microcrystals m.p. 159° (mixture of exo and endo-isomers by t.l.c.). Chromatography of the mixture (2.5 g.) on silica gel (100 g.) with ethyl acetate afforded the faster running exo-isomer as colourless microcrystals, m.p. 149°. Recrystallisation from petroleum-ether (8–100) afforded colourless flocculent feathers, m.p. 155°.

b. 1,2,3,4-Tetrahydro-1,4-exo-methano-N-methyl-2,3-naphthalene dicarboximide 1,2,3,4-Tetrahydro-1,4-exo-methano-2,3-naphthalene dicarboxylic anhydride (400mg.) was dissolved in ethanolic methylamine (10 ml.) and the solution evaporated to dryness. The residue was heated under reflux overnight in toluene (100 ml.) using a Dean-Stark apparatus. The mixture was cooled, filtered and the filtrate evaporated to leave a cream solid. Recrystallisation from methanol afforded colourless needles, m.p. 146°.

c. 3a,4,9,9a-Tetrahydro-4,9-exo-methano-2-methylbenz[f]isoindoline, maleate

A solution of 1,2,3,-tetrahydro-1,4-exo-methano-N-methyl-2,3-naphthalene discarboximide (400 mg.) in dry ether (30 ml.) was added dropwise to a stirred suspension of lithium aluminium hydride (350 mg.) in dry ether (100 ml.) and heated to reflux. After 4 hours the excess of the hydride was decomposed with water. The ether was separated, dried and evaporated to leave a colourless gum. This was dissolved in ether (20 ml) and treated with a solution of maleic acid (200 mg.) in ether (20 ml.) to give colourless microcrystals, m.p. 184°.

EXAMPLE 18

3a, 4,9,9a -tetrahydro-4,9-endo-methano-2-methylbenz[f]isoindoline, hydrochloride A solution of 1,2,3,4-tetrahydro-1,4-endo-methano-N-methyl-2,3-naphthalene dicarboximide (1.2 g.) in dry tetrahydrofuran (25 m.) was added dropwise to a stirred suspension of lithium aluminium hydride (500 mg.) in dry ether (120 ml.) and heated to reflux. After 5 hours the mixture was cooled and the excess of the hydride decomposed with water. The ether layer was separated, dried and evaporated to leave a colourless oil, which was dissolved in ethyl acetate (100 ml.) and treated with ethereal hydrogen chloride. The solution was evaporated and the residue triturated with acetone to give colourless microcrystals, m.p. 262°.

The following compounds were prepared in a similar manner:

2-Ethyl-3a,4,9,9,a-tetrahydro-4,9-endo-methanobenz[f isoindoline,(-)di-p-toluoyl tartrate (m.p. 152°) (EtOAc).

2-Benzyl-3a,4,9,9a-tetrahydro-4,9-endo-methanobenz[f] isoindoline, m.p. 71.5°.

EXAMPLE 19

3a,4,9,9a-Tetrahydro-4,9-endo-methanobenz[f]isoindoline-2-carboxamide

A solution of 3a,4,9,9a-tetrahydro-4,9-endo-methanobenz[f]isoindoline (600 mg.) and sodium cyanate (2 g.) in glacial acetic acid (3 ml.) and water (40 ml.) was heated under reflux for 2 days. Cooling afforded colourless plates which gave colourless microcrystals, m.p. 205° on recrystallisation from benzene.

EXAMPLE 20

7-(Dimethylamine)13a,4,9,9a-Tetrahydro-2-methylbenz[f] isoindolin-6-methanol

A solution of 6-amino-3a,4,9,9a-tetrahydro-2-methylbenz[f]isoindoline (4 g.) in formaldehyde (15 ml; 36%) and formic acid (15 ml; 98%) was heated under reflux for 24 hours and the solvent then removed by distillation. The oily residue was basified with sodium hydroxide (5N) and extracted with ethyl acetate. Evaporation of the dried extracts gave a gum (4 g.) which was chromatographed on alumina (80 g. Laporte 'H'). Elution with ethyl acetate gave the product as a colourless gum which crystallised on standing. Recrystallisation from light petroleum ether (b.p 60°–80°) afforded colourless nodules, m.p. 106°.

EXAMPLE 21

3a, 4,9,9a-Tetrahydro-α, 2-dimethylbenz[f]isoindoline-6-methanol  a. Methyl(3a,4,9,9a-tetrahydro-2-methylbenz[f]isoindoline-6-yl)ketone A slurry of 3a, 4,9,9a-tetrahydro-2-methylbenz[f]isoindoline, hydrochloride (6.5 g.) in boiling acetyl chloride (60 ml.) was added, over 10 min., to a stirred suspension of aluminium chloride (13 g.) in carbon tetrachloride (200 ml.). After stirring overnight the reaction mixture was decomposed with ice/HCl and the aqueous phase separated, washed with ether and basified. Extraction with ethyl acetate afforded a brown gum which crystallised from light petroleum (b.p. 40°–60°) as colourless microcrystals, m.p. 55°C.

b. 3a, 4,9,9a-Tetrahydro-α, 2-dimethylbenz[f]isoindoline-6-methanol

Methyl(3a,4,9,9a-tetrahydro-2-methylbenz[f] isoindoline-6-yl)ketone (2g.) in dry ether (20 ml.) was added dropwise to a stirred suspension of lithium aluminium hydride (500 mg.) in dry ether (100 ml.). The mixture was stirred under reflux for 2 hr., cooled and excess hydride decomposed with water. The organic phase was separated, dried and evaporated to leave a colourless solid which was recrystallised from light petroleum (b.p. 40°–60°) to give square plates m.p. 73°–83°.

EXAMPLE 22

2-[Methyl(3a,4,9,9a-tetrahydro-2-methylbenz[f]isoindolin-6-yl)amino]ethanol 6-(Dimethylamino)-3a, 4,9,9a-tetrahydro-2-methylbenz[f]isoindoline (2 g.) in aqueous formaldehydr (25 ml; 36%) was kept at 70°C for 3 days. The mixture was then basified and extracted with ether. Evaporation of the dried extracts left an amber gum which was filtered down an alumina column (60 g; Laporte 'H') with ethyl acetate to give the title compound as an amber gum. Crystallisation of this from light petroleum (b.p. 40°–60°) afforded colourless microcrystals, m.p. 84°C.

EXAMPLE 23

3a,4,9,9a-Tetrahydrobenz[f]isoindoline-2-carboxamide 3a,4,9,9a-Tetrahydrobenz[f]isoindoline (1.2 g.) and sodium cyanate (6 g.) in glacial acetic acid (6 ml.) and water (80 ml.) were heated under reflux for 2 days. Cooling afforded colourless needles, which were recrystallised from benzene to give colourless microcrystals, m.p. 182°.

EXAMPLE 24

3a,4,9,9a-Tetrahydro-2-methyl-5,7-dinitrobenz[f]isoindoline, hydrochloride 3a,4,9,9a-Tetrahydro-2-methylbenz[f]isoindoline, hydrochloride (10 g.) was added to fuming nitric acid (30 ml.) and fuming sulphuric acid (35 ml.) with stirring, keeping the temperature below 40°C. After stirring for 1 hour the mixture was poured onto ice, basified and extracted with ether. During evaporation of the dried extracts a solid separated out and was filtered off. Evaporation of the filtrate left a brown gum which was chromatographed on alumina (275 g; Laporte 'H') with ethyl acetate to give the title compound as a light brown gum. Treatment of this in ether with ethereal HCl afforded a buff solid which was recrystallised from ethyl acetate to give a colourless microcrystals, m.p. 232°.

EXAMPLE 25

3a,4,9,9a-Tetrahydro-2-methyl-6,7-dinitrobenz[f]isoindoline 3a,4,9,9a-Tetrahydro-2-methylbenz[f]isoindoline, hydrochloride (10 g.) was added to fuming nitric acid (30 ml.) and fuming sulphuric acid (35 ml.) with stirring, maintaining the temperature below 40°C. After stirring for 1 hour, the mixture was poured onto ice, basified and extracted with ether. During evaporation of the dried extracts, a solid separated out which was filtered off and recrystallised from cyclohexane to give colourless microcrystals, m.p. 122°.

EXAMPLE 26

4-(3a,4,9,9a-tetrahydrobenz[f]isoindolin-2-yl)-4'-fluorobutyrophenone, hydrochloride 3a,4,9,9a-Tetrahydrobenz[f]isoindoline, hydrochloride (4 g.), potassium carbonate (6 g.), sodium iodide (3 g.) and α-chloro-p-fluorobutyrophenone (6 g.) in 2-butanone (100 ml.) were stirred under reflux for 3 days. Undissolved solid was filtered off and filtrate evaporated. The residue was dissolved in ethyl acetate and the solution exhaustively extracted with 5N hydrochloric acid. The combined extracts were basified, and extracted with ethyl acetate. Evaporation of the dried extracts left a dark brown oil which was chromatographed on alumina (150 g; Laporte 'H') with cyclohexane/ethyl acetate (2:1) to give the title compound as a tan gum. A solution of this in ether was treated with ethereal HCl and the resultant precipitate was crystallised from methanol/ethyl acetate to give buff microcrystals, m.p. 200°C.

EXAMPLE 27

3a,4,9,9a-Tetrahydro-2-methyl-4-phenylbenz[f]isoindoline 3a,4,9,9a-Tetrahydro-2-methyl-4-phenylbenz[f]isoindolin-4-ol (1.2 g.) in ethanol (25 ml.) prepared according to Example 31 and concentrated hydrochloric acid (2 ml.) was hydrogenated at room temperature and atmospheric pressure over 10% palladium oxide on charcoal catalyst (1 g.). After uptake of hydrogen had ceased, catalyst and solvent were removed to leave a colourless sticky solid. This was dissolved in water (20 ml), basified with dilute aqueous sodium hydroxide and extracted several times with ethyl acetate. Evaporation of the dried extracts left at a colourless solid, which was recrystallised from light petroleum (b.p. 40°–60°) to give colourless microcrystals m.p. 123°–6°.

Similarly was prepared 3a,4,9,9a-tetrahydro-2,4-dimethylbenz[f]isoindoline, (-)di-p-toluoyl tartrate m.p. 145° (EtOAc) from 3l,4,9,9a-tetrahydro-2,4dimethylbenz[f] isoindolin-4-ol.

EXAMPLE 28

3a,4,9,9a-Tetrahydro-2-methyl-4-phenylbenz[f]isoindolin-4-ol 3a,4,9,9a-Tetrahydro-2-Methylbenz[f]isoindolin-4-one (2 g.) prepared according to Example 34 in dry tetrahydrofuran (50 ml.) was added dropwise to a stirred solution of phenyl magnesium bromide (4.4 g.) in dry ether (50 ml.). After being stirred under reflux overnight, the mixture was decomposed by the addition of a saturated aqueous solution of ammonium chloride. The organic phase was separated off, dried and evaporated to leave a buff solid. Recrystallisation from ethyl acetate gave a colourless feathery solid, m.p. 180°C.

EXAMPLE 29

3a,4,9,9a-Tetrahydro-2,4-dimethylbenz[f]isoindolin-4-ol 3a,4,9,9a-Tetrahydro-2-methylbenz[f]isoindolin-4-one (500 mg.) prepared according to Example 34 in dry tetrahydrofuran (25 ml.) was treated with stirring at −50°C under nitrogen with a 2.18 M solution of methyl lithium in ether (7 ml.). After 18 hours the solution was decomposed with a saturated aqueous solution of ammonium chloride. The organic phase was separated off, dried and evaporated to leave a red gum, which crystallised on standing. Recrystallisation from light petroleum (b.p. 60°–80°) afforded colourless microcrystals, m.p. 110°C.

EXAMPLE 30

3a,4,9,9a-Tetrahydro-2-(o-methoxyphenoxy)-1methyl-ethyl] benz[f]isoindoline 3a,4,9,9a-Tetrahydrobenz[f]isoindoline (1 g.) and 1-(o-methoxy phenoxy)-2-propanone (1 g.) in ethanol (50 ml.) were hydrogenated over 5% platinum on charcoal catalyst (500 mg.) at room temperature and atmospheric pressure. Catalyst and solvent were removed to leave a tan gum which was chromatographed on alumina (75 g; Laporte 'H') with cyclohexane/ethyl acetate (2:1) to give a colourless gum, which crystallised on standing. Recrystallisation from light petroleum (b.p. 40°–60°) afforded colourless microcrystals, m.p. 71°–73°.

EXAMPLE 31

3a,4,9,9a-Tetrahydro-2-methylbenz[f]isoindolin-4-one 3a,4,9,9a-Tetrahydro-2-methylbenz[f]isoindolin-4-ol (4 g.) in acetone (100 ml.) was treated with Jones' reagent[from chromium trioxide (7 g.), water (50 ml.) and concentrated sulphuric acid (6.1 ml.)](40 ml.) at 10°C with stirring. After 2 hours the solution was basified with 5N sodium hydroxide solution (60 ml.) and the solid was filtered off and washed well with ethyl acetate. The organic phase was separated from the filtrate, washed with water, dried and evaporated to leave a light brown oil (3.5 g.). Distillation afforded a colourless oil, b.p. 120° at 0.1 torr. The (-) di-p-toluoyl tartrate salt had m.p. 145°C (from ethyl acetate).

EXAMPLE 32

Details are given below of the preparation of formulations containing active ingredients according to the invention. The abbreviation AH 8649 means the compound of Example 3 in the form of its free base, the suffix A means that the material taken is the hydrochloride.

| Tablets Formula | mg/tablet | mg/tablet |
|---|---|---|
| AH 8649A | 36 | 12 |
| (equivalent to AH 8649 base) | 30 | 10 |
| Lactose B.P. | 141 | 120.5 |
| Maize starch B.P. | 20 | 15.0 |
| Maize starch (as 5% paste) | 2.0 | 1.5 |
| Magnesium stearate B.P. | 1.0 | 1.0 |
| Total Tablet Weight | 200.0 | 150.0 |

METHOD OF MANUFACTURE

Blend together the milled AH 8649A and Lactose. Prepared the requisite quantity of 5% Starch Paste and add to the mixed powder and mix until a uniform damp cohesive mass is formed. Granulate this mass by passing through a suitable mill or sieve to produce discrete granules. Dry the granules in either a fluid bed drier or on trays in a hot air oven at a temperature of about 50°C. After drying pass the granules through a 30 mesh B.S. sieve to break up aggregates.

Mix together the dried granules, the Maize Starch and the Magnesium Stearate and compress on a suitable tablet press. The tablets containing 30 mg AH 8649 each weigh about 200 mg. and are 8.0 mm in diameter, those containing 10 mg. AH 8649 each weigh 156 mg. and are 7.0 mm in diameter.

| Injection Formulation Formula | mg/ml |
|---|---|
| AH 8649A | 6.0 |
| (equivalent to AH 8649 base) | 5.0 |
| Sodium chloride B.P. | 7.6 |
| Water for Injections B.P. to | 1 ml. |

Method of Manufacture

Dissolve the AH 8649A and the Sodium Chloride in 90% of the Water for Injections. When solution is complete make up to volume with further water for injections. Filter through a suitable clarifying filter.

The solution can then either be packed into 5 ml. neutral glass snap-ring ampoules and sterilised by heating in an autoclave or by being sterilised by filtration and distributed aseptically into 5 ml. neutral glass snap-ring ampoules.

I claim:

1. A compound of the formula

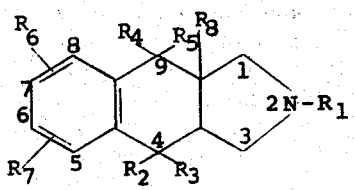

or a non-toxic pharmaceutically acceptable acid addition salt thereof, in which:

$R_1$ represents hydrogen; alkyl ($C_1$-$D_6$); alkenyl ($C_2$-$C_6$); alkyl ($C_1$-$C_6$) substituted by hydroxy, dialkyl ($C_1$-$C_4$) amino, phenyl, benzoyl substituted by halo, or phenoxy substituted by ($C_1$-$C_4$) alkoxy; or carbamoyl;

$R_2$ represents hydrogen, hydroxy, ($C_1$-$C_6$) alkyl or phenyl, or together with $R_4$ represents a methylene bridge;

$R_3$ represents hydrogen, ($C_1$-$C_6$) alkyl or phenyl;

$R_4$ represents hydrogen of hydroxy or together with $R_2$ a methylene bridge;

$R_5$ represents hydrogen;

$R_6$ represents hydrogen, dialkyl ($C_1$-$C_4$) amino or nitro;

$R_7$ represents hydrogen, hydroxy, hydroxyalkyl ($C_1$-$C_4$), nitro, ($C_1$-$C_4$) alkoxy, acetyloxy, halogen, or a group —$NR_9R_{10}$ in which $R_9$ represents hydrogen, alkyl ($C_1$-$C_4$), acetyl, alkyl ($C_1$-$C_4$) sulphonyl or ethoxy carbonyl and $R_{10}$ represents hydrogen, alkyl ($C_1$-$C_4$) or hydroxyalkyl ($C_1$-$C_4$); and $R_8$ represents hydrogen or ($C_1$-$C_6$) alkyl.

2. A compound as claimed in claim 1 in which $R_2$ represents a hydrogen atom or together with $R_4$ a methylene bridge.

3. A compound as claimed in claim 1 in which $R_3$ represents hydrogen.

4. A compound as claimed in claim 1 in which $R_4$ represents hydrogen or hydroxy, or together with $R_2$ a methylene bridge.

5. A compound as claimed in claim 1 in which $R_6$ represents hydrogen or dialkyl ($C_4$-$C_4$) amino.

6. A compound as claimed in claim 1 in which $R_7$ represents hydrogen, hydroxyalkyl ($C_1$-$C_4$), or a group —$NR_9R_{10}$ in which $R_9$ represents hydrogen or alkyl ($C_1C_4$) and $R_{10}$ represents hydroxyalkyl ($C_1$-$C_4$).

7. A compound as claimed in claim 1 in which $R_8$ represents hydrogen.

8. The compound of claim 1 which is 3a,4,9,9a-tetrahydro-2-methylbenz[f]isoindoline maleate.

9. The compound of claim 1 which is 3a,4,9,9a-tetrahydro-2-methylbenz[f]isoindolin-6-ol.

10. The compound of claim 1 which is 3a,4,9,9a-tetrahydro-2-isopropylbenz[f]isoindoline, maleate.

11. The compound of claim 1 which is 2-benzyl-3a,4,9,9a-tetrahydrobenz[f]isoindoline, maleate.

12. The compound of claim 1 which is 3a,4,9,9a-tetrahydro-2-phenethylbenz[f]isoindoline, hydrochloride.

13. The compound of claim 1 which is 2-[2-(diethylamino)ethyl]-3a,4,9,9a-tetrahydrobenz[f]isoindoline, dimaleate.

14. The compound of claim 1 which is 2-[3-(dimethylamino)propyl]-3a,4,9,9a-tetrahydrobenz[f]isoindoline, hydrochloride.

15. The compound of claim 1 which is 3a,4,9,9a-tetrahydro-2-benz[f]isoindoline ethanol.

16. The compound of claim 1 which is 3a,4,9,9a-tetrahydro-2-propylbenz[f]isoindoline, maleate.

17. The compound of claim 1 which is 2-ethyl-3a,4,9,9a-tetrahydrobenz[f]isoindoline, maleate.

18. The compound of claim 1 which is 3a,4,9,9a-tetrahydrobenz[f]isoindoline, maleate.

19. The compound of claim 1 which is 3a,4,9,9a-tetrahydro-4,9-endo-methanobenz[f]isoindoline, hydrochloride.

20. The compound of claim 1 which is 3a,4,9,9a-tetrahydro-2-(3-methylbut-2-enyl)benz[f]isoindoline, hydrochloride.

21. The compound of claim 1 which is 3a,4,9,9a-tetrahydro-2-methyl-6-nitrobenz[f]isoindoline, hydrochloride.

22. The compound of claim 1 which is 6-amino-3a,4,9,9-tetrahydro-2-methylbenz[f]isoindoline.

23. The compound of claim 1 which is 3a,4,9,9a-tetrahydro-2-methylbenz[f]isoindolin-6-ol.

24. The compound of claim 1 which is 3a,4,9,9a-tetrahydro-2,3a-dimethylbenz[f]isoindoline, (-)di-p-toluoyl tartrate, hemihydrate.

25. The compound of claim 1 which is 3a,4,9,9a-tetrahydro-6-methoxy-2-methylbenz[f]isoindoline, maleate.

26. The compound of claim 1 which is 3a,4,9,9a-tetrahydro-2-methylbenz[f]isoindolin-6-ol, acetate (ester).

27. The compound of claim 1 which is N-(3a,4,9,9a-tetrahydro-2-methylbenz[f]isoindolin-6-yl)methane sulphonamide.

28. The compound of claim 1 which is (3a,4,9,9a-tetrahydro-2-methylbenz[f]isoindolin-6-yl)acetamide, acetate, hemihydrate.

29. The compound of claim 1 which is 6-chloro-3a,4,9,9a-tetrahydro-2-methylbenz[f]isoindoline, maleate.

30. The compound of claim 1 which is 3a,4,9,9a-tetrahydro-2-methylbenz[f]isoindoline-6-carbamic acid, ethyl ester, hydrochloride.

31. The compound of claim 1 which is 3a,4,9,9a-tetrahydro-N,2-dimethylbenz[f]isoindoline16 -carbamic acid, ethyl ester, (-)di-p-toluoyltartrate.

32. The compound of claim 1 which is 3a,4,9,9a-tetrahydro-2-methyl-6-(methylamino)benz[f]isoindoline.

33. The compound of claim 1 which is 6-dimethylamino)-3a,4,9,9a-tetrahydro-2-methylbenz[f]isoindoline.

34. The compound of claim 1 which is 3a,4,9,9a-tetrahydro-2-methylbenz[f]isoindolin-4α-ol.

35. The compound of claim 1 which is 3a,4,9,9a-tetrahydro-2-methylbenz[f]isoindolin-4β-ol.

36. The compound of claim 1 which is 3a,4,9,9a-tetrahydro-4,9-exo-methano-2-methylbenz[f]isoindoline, maleate.

37. The compound of claim 1 which is 3a,4,9,9a-tetrahydro-4,9-endo-methanol-2-methylbenz[f]isoindoline, hydrochloride.

38. The compound of claim 1 which is 2-ethyl-3a,4,9,9a-tetrahydro-4,9-endo-methanobenz[f]isoindoline, (-)di-p-toluoyl tartrate.

39. The compound of claim 1 which is 2-benzyl-3a,4,9,9a-tetrahydro-4,9-endo-methanobenz[f]isoindoline.

40. The compound of claim 1 which is 3a,4,9,9a-tetrahydro-4,9-endo-methanobenz[f]isoindoline-2-carboxamide.

41. The compound of claim 1 which is 7-(dimethylamino)- 3a,4,9,9a-tetrahydro-2-methylbenz[f]isoindoline-6-methanol.

42. The compound of claim 1 which is 3a,4,9,9a-tetrahydro-α,2-dimethylbenz[f]isoindoline16-methanol.

43. The compound of claim 1 which is 2-[methyl(3a,4,9,9a-tetrahydro-2-methylbenz[f]isoindolin-6-yl)amino]ethanol.

44. The compound of claim 1 which is 3a,4,9,9a-tetrahydrobenz[f]isoindoline-2-carboxamide.

45. The compound of claim 1 which is 3a,4,9,9a-tetrahydro-2-methyl-5,7-dinitrobenz[f]isoindoline, hydrochloride.

46. The compound of claim 1 which is 3a,4,9,9a-tetrahydro-2-methyl-6,7-dinitrobenz[f]isoindoline.

47. The compound of claim 1 which is 4-(3a,4,9,9a-tetrahydrobenz[f]isoindolin-2yl)-4'-fluorobutyrophenone hydrochloride.

48. The compound of claim 1 which is 3a,4,9,9a-tetrahydro-2-methyl-4-phenylbenz[f]isoindoline.

49. The compound of claim 1 which is 3a,4,9,9a-tetrahydro-2,4-dimethylbenz[f]isoindoline, (-)di-p-toluoyl tartrate.

50. The compound of claim 1 which is 3a,4,9,9a-tetrahydro-2-methyl-4-phenylbenz[f]isoindolin-4-ol.

51. The compound of claim 1 which is 3a,4,9,9a-tetrahydro2,4-dimethylbenz[f]isoindolin-4-ol.

52. The compound of claim 1 which is 3a,4,9,9a-tetrahydro-2[2-(o-methoxyphenoxy)-1-methyl-ethyl]benz[f]isoindoline.

53. A compound of the formula

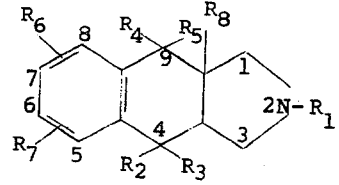

or a non-toxic pharmaceutically acceptable acid addition salt thereof, in which:

$R_1$ represents hydrogen, alkyl ($C_1$-$C_4$), alkenyl ($C_2$-$C_6$) or alkyl ($C_1$-$C_4$) substituted by hydroxy, amino or dialkyl ($C_1$-$C_4$) amino;

$R_2$ represents hydrogen or together with $R_4$ represents a methylene bridge;

$R_3$ represents hydrogen;

$R_4$ represents hydrogen or hydroxy or together with $R_2$ a methylene bridge;

$R_5$ represents hydrogen;

$R_6$ represents hydrogen or dialkyl ($C_1$-$C_4$) amino;

$R_7$ represents hydrogen, hydroxyalkyl ($C_1$-$C_4$), or a group —$NR_9R_{10}$ in which $R_9$ represents hydrogen or alkyl ($C_1$-$C_4$) and $R_{10}$ represents hydroxalkyl ($C_1$-$C_4$); and $R_8$ represents hydrogen.

* * * * *

Disclaimer 3,890,347.—*David Middlemiss*, London, England. ISOINDOLINE DERIVATIVES. Patent dated June 17, 1975. Disclaimer filed Feb. 21, 1978, by the assignee, *Allen & Hanburys Limited*.

Hereby enters this disclaimer to claim 48 of said patent.

[*Official Gazette April 18, 1978.*]